United States Patent
Ishimaru et al.

(10) Patent No.: US 7,582,153 B2
(45) Date of Patent: Sep. 1, 2009

(54) AQUEOUS INK FOR INKJET

(75) Inventors: Yoshiaki Ishimaru, Amimachi (JP); Takashi Saito, Amimachi (JP); Akiko Hayashi, Amimachi (JP); Sayako Nakao, Amimachi (JP); Yoshifumi Watanabe, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 12/219,658

(22) Filed: Jul. 25, 2008

(65) Prior Publication Data

US 2009/0025605 A1    Jan. 29, 2009

(30) Foreign Application Priority Data

Jul. 27, 2007  (JP) .............................. 2007-196385
Apr. 18, 2008  (JP) .............................. 2008-109064

(51) Int. Cl.
*C09D 11/02*  (2006.01)
(52) U.S. Cl. ................................ 106/31.86; 106/31.67
(58) Field of Classification Search .............. 106/31.86, 106/31.67; 347/100
See application file for complete search history.

(56) References Cited

U.S. PATENT DOCUMENTS

| | | | |
|---|---|---|---|
| 5,596,027 A * | 1/1997 | Mead et al. .............. | 106/31.86 |
| 5,938,829 A | 8/1999 | Higashiyama et al. | |
| 6,527,843 B1 | 3/2003 | Zaima et al. | |
| 6,676,734 B2 * | 1/2004 | Nagashima et al. ...... | 106/31.86 |
| 6,676,736 B2 * | 1/2004 | Nakano et al. ........... | 106/31.86 |
| 6,893,491 B2 * | 5/2005 | Yamazaki et al. ........ | 106/31.86 |
| 6,988,795 B2 * | 1/2006 | Doi ........................... | 347/100 |
| 7,220,301 B2 * | 5/2007 | Nagashima et al. ...... | 106/31.86 |
| 7,285,161 B2 * | 10/2007 | Yamazaki et al. ........ | 106/31.86 |
| 7,449,056 B2 * | 11/2008 | Kato et al. ................ | 106/31.68 |
| 2002/0107303 A1 | 8/2002 | Miyabashi et al. | |
| 2004/0024085 A1 | 2/2004 | Ishizuka et al. | |
| 2005/0005817 A1 | 1/2005 | Kusakata et al. | |

FOREIGN PATENT DOCUMENTS

| | | |
|---|---|---|
| EP | 1 535 956 | 6/2005 |
| JP | 10-130550 | 5/1998 |
| JP | 2001-207090 | 7/2001 |
| JP | 2003-073358 | 3/2003 |
| JP | 2004075759 | 3/2004 |
| JP | 2004-277562 | 10/2004 |
| JP | 2005-220296 | 8/2005 |

* cited by examiner

*Primary Examiner*—Helene Klemanski
(74) *Attorney, Agent, or Firm*—The Nath Law Group; Jerald L. Meyer; Susanne M. Hopkins

(57) ABSTRACT

An aqueous ink for an inkjet is provided, including: a pigment; a water-soluble organic solvent A including at least one of a diglycerol and a polyglycerol; a water-soluble organic solvent B including a polyethylene glycol monoalkyl ether represented by formula (1): $RO-(CH_2CH_2O)_n-H$ where R represents an alkyl group having from 4 to 6 carbon atoms, and n represents an integer from 4 to 6; and water

9 Claims, No Drawings

AQUEOUS INK FOR INKJET

CROSS REFERENCE TO RELATED APPLICATIONS

This Application is based upon and claims the benefit of priority from prior Japanese Patent Applications No. 2007-196385 filed on Jul. 27, 2007 and No. 2008-109064 filed on Apr. 18, 2008; the entire contents of which are incorporated by reference herein.

BACKGROUND OF THE INVENTION

1. Field of the Invention

The present invention relates to an aqueous ink for an inkjet.

2. Description of the Related Art

An inkjet recording system is a printing system in which printing is conducted by spraying a liquid with a high degree of fluidity from very fine nozzles and onto a recording medium such as a sheet of paper. These systems enable the printing of high-resolution, high-quality images at high speed and with minimal noise, using a comparatively inexpensive printing apparatus, and are rapidly becoming widespread.

In terms of the inks for these systems, aqueous inks are becoming more prevalent, as they are capable of producing high-quality printed items at low cost. Aqueous inks are inks in which water has been included to enhance the drying properties, and compared with oil-based inks, offer the advantages of resistance to show-through (penetration of the ink through to the underside of the recording medium) even if double-sided printing is conducted onto plain paper, and favorable text reproduction. The colorants used for these aqueous inks can be broadly classified into dyes and pigments, and of these, pigment inks tend to be rapidly gaining in popularity, as they offer superior levels of light resistance and water resistance.

Examples of problems that may occur when printing an aqueous ink onto plain paper include the phenomena of curling (convex curling) and cockling (wrinkling). These phenomena occur because the aqueous ink penetrates rapidly into the plain paper fibers of the recording medium, causing cleavage of the hydrogen bonds between fibers, and causing the paper to swell.

Patent reference 1 (Japanese Patent Laid-Open No.2005-220296) discloses an aqueous ink for an inkjet that comprises a solvent medium with a specified surface tension, viscosity and vapor pressure, and this ink exhibits improved discharge characteristics within the recording head, improved decapping properties, and excellent show-through resistance, text quality and curl properties.

Patent reference 2 (Japanese Patent Laid-Open No. H10-130550) discloses an ink that is suitable for color printing, the ink comprising water, a dye, a polyhydric alcohol lower alkyl ether, a nonionic acetylene glycol, and glycerol or a specific polyhydric alcohol, and this ink exhibits excellent curling prevention capabilities.

SUMMARY OF THE INVENTION

However, according to investigations conducted by the inventors of the present invention, use of the technology described in the patent reference 1, particularly in those cases where a pigment is used as the colorant, results in inferior storage stability, and problems with the performance of the printer head upon standing, with nozzle blockages tending to occur when the ink is introduced into, and then left to sit inside, the printer head.

The technology disclosed in the patent reference 2 is a dye-based ink, and is based upon the concept of causing the solvent components to penetrate into the recording medium, and then retaining these components within the recording medium to inhibit the evaporation of the moisture content within the ink, thereby preventing curling. However, when left to stand for a long period of time, the moisture evaporates from the printed item, causing the hydrogen bonds to regenerate between the paper fibers, and this leads to the paper shrinking and developing concave curling (namely, curling that occurs in the opposite direction to that observed upon paper swelling).

Accordingly, the present invention has an object of providing an aqueous pigment ink for an inkjet that is able to suppress curling, and exhibits excellent storage stability and excellent performance of the printer head upon standing.

The present invention relates to an aqueous ink for an inkjet that comprises a pigment, a water-soluble organic solvent A, a water-soluble organic solvent B, and water, wherein the water-soluble organic solvent A comprises at least one of diglycerol and polyglycerol, and the water-soluble organic solvent B comprises a polyethylene glycol monoalkyl ether represented by a general formula (1): $RO-(CH_2CH_2O)_n-H$ (wherein, R represents an alkyl group of 4 to 6 carbon atoms, and n represents an integer from 4 to 6).

Another aspect of the present invention relates to a printed item that has been printed using the aforementioned aqueous ink for an inkjet according to the present invention.

DETAILED DESCRIPTION OF THE EMBODIMENTS

The present invention provides an aqueous ink for an inkjet (hereafter also abbreviated to simply "the ink") that comprises a pigment, a water-soluble organic solvent A, a water-soluble organic solvent B, and water, wherein the water-soluble organic solvent A comprises at least one of diglycerol and polyglycerol, and the water-soluble organic solvent B comprises a polyethylene glycol monoalkyl ether represented by a general formula (1): $RO-(CH_2CH_2O)_n-H$ (wherein, R represents an alkyl group of 4 to 6 carbon atoms, and n represents an integer from 4 to 6).

In other words, the present invention provides an aqueous ink for an inkjet in which the organic solvent comprises at least one of diglycerol and polyglycerol, as well as a specific polyethylene glycol monoalkyl ether, and by employing this configuration, an ink can be provided which is not only capable of suppressing curling, thereby ensuring favorable paper transport properties, but also exhibits excellent storage stability and head performance upon standing.

A feature of the present invention is the use of a combination of the water-soluble organic solvent A which has a high polarity, and the water-soluble organic solvent B which has a low polarity. The inventors of the present invention found out that a high-polarity solvent was necessary in terms of improving the storage stability and the head performance upon standing, and also found out that in order to accelerate drying of the printed item and prevent curling, the use of a high-polarity solvent that retains minimal moisture (namely, exhibits minimal hydrophobicity) was very effective. Moreover, the inventors also found out that by combining this high-polarity solvent with a low-polarity solvent, the solubility balance of the ink system collapsed at the paper surface during printing, with the low-polarity solvent and the water content rapidly separating out of the ink, and as a result, the water was retained at the paper surface and dried readily, thereby yielding a curling prevention effect.

On the basis of these observations, the water-soluble organic solvent A is preferably a glycerol polymer or polyol, and the water-soluble organic solvent B is preferably a polyhydric alcohol lower (3 to 6 carbon atoms) alkyl ether-based solvent.

Moreover, from the viewpoints of the head performance upon standing, the continuous discharge performance, and the storage stability, the water-soluble organic solvents A and B are preferably both high boiling point solvents with boiling points of at least 200° C. The boiling points of both solvents are even more preferably 250° C. or higher.

In terms of the solvent solubility, the polarity can be expressed using the α value. In the present invention, the water-soluble organic solvent A is a solvent having an α value of at least 65, and preferably 70 or greater. The water-soluble organic solvent B is a solvent having an α value of less than 65, and preferably not more than 55.

The α value is a value obtained from the formula tan α=(inorganic value/organic value). In this description, the "inorganic value" and the "organic value" are properties used in the "organic conception diagram" proposed by Atsushi Fujita, in which an organic compound is described in terms of two factors, namely an "organic character" (covalent bonding character) derived from the covalent bond chain within the carbon region of the compound, and an "inorganic character" (ionic bonding character) derived from the effect of the electrostatic properties that exist within the substituents (functional groups), and each of these factors is converted to a numerical value. In other words, the "inorganic value" and "organic value" are determined from the structure and the like of the organic compound, and the α value, which represents the ratio between the two factors, indicates the quantitative balance between the "organic character" and the "inorganic character" of the compound. Details regarding the "organic conception diagram" are described in "Systematic Organic Qualitative Analysis (Mixtures)", Atsushi Fujita et al., Kazama Shobo Co., Ltd. (1974); the disclosure of which is incorporated herein by reference.

The ink of the present invention comprises at least one of diglycerol and polyglycerol as the water-soluble organic solvent A. The inventors of the present invention found out that in terms of the quantity of moisture retention (the hydrophobicity) of the water-soluble organic solvent A, the equilibrium water content was preferably not more than 15% at a relative humidity of 50%, and was preferably not more than 35% at a relative humidity of 80%. The solvents selected so as to satisfy these requirements are diglycerol and polyglycerol. In terms of the curl suppression effect, the polyglycerol preferably has a molecular weight of not less than 300.

Examples of other water-soluble organic solvents A that may be used in combination with the diglycerol and/or polyglycerol include ethylene glycol, diethylene glycol, triethylene glycol, tripropylene glycol, glycerol, 1,2,4-butanetriol, 1,2,6-hexanetriol, 1,2,5-pentanetriol, 1,2-butanediol, 1,3-butanediol, 1,4-butanediol, 1,3-propanediol, monoethanolamine, diethanolamine and triethanolamine. A plurality of these solvents may also be used in combination.

In those cases where these other solvents are also used, the proportion of diglycerol and/or polyglycerol within the water-soluble organic solvent A is preferably at least 75% by mass, and is even more preferably 90% by mass or higher.

The water-soluble organic solvent B must include, at least, a polyethylene glycol monoalkyl ether represented by the formula (1): $RO-(CH_2CH_2O)_n-H$ (wherein, R represents an alkyl group of 4 to 6 carbon atoms, and n represents an integer from 4 to 6). If the number of repeating units n is 3 or less, then the discharge characteristics tend to deteriorate, whereas if the value of n is 7 or greater, then the degree of paper deformation following ink drying is more likely to increase. If the number of carbon atoms within the alkyl group R is 3 or less, then the degree of paper deformation immediately following printing and following ink drying is likely to increase, whereas if the number of carbon atoms within R is 7 or greater, then the resulting increase in the ink viscosity may cause a deterioration in the discharge performance and the storage stability. Although the alkyl group R may be a branched chain, a straight-chain group is preferred.

Specific examples of the water-soluble organic solvent B include tetraethylene glycol monobutyl ether, tetraethylene glycol monopentyl ether, tetraethylene glycol monohexyl ether, pentaethylene glycol monobutyl ether, pentaethylene glycol monopentyl ether, pentaethylene glycol monohexyl ether, hexaethylene glycol monobutyl ether, hexaethylene glycol monopentyl ether, and hexaethylene glycol monohexyl ether.

Of these, solvents that include tetraethylene glycol monobutyl ether, which is the solvent of the above formula (1) in which R is a butyl group and n is 4, are particularly preferred.

Examples of other water-soluble organic solvents B that may be used in combination with the polyethylene glycol monoalkyl ether described above include:

ethylene glycol monoalkyl ethers (such as ethylene glycol monomethyl ether, ethylene glycol monoethyl ether, and ethylene glycol monobutyl ether);

diethylene glycol monoalkyl ethers (such as diethylene glycol monomethyl ether, diethylene glycol monoethyl ether, and diethylene glycol monobutyl ether);

triethylene glycol monoalkyl ethers (such as triethylene glycol monomethyl ether, triethylene glycol monoethyl ether, and triethylene glycol monobutyl ether);

propylene glycol monoalkyl ethers (such as propylene glycol monomethyl ether, propylene glycol monoethyl ether, and propylene glycol monobutyl ether);

dipropylene glycol monoalkyl ethers (such as dipropylene glycol monomethyl ether, dipropylene glycol monoethyl ether, and dipropylene glycol monobutyl ether); and tripropylene glycol monoalkyl ethers (such as tripropylene glycol monomethyl ether, tripropylene glycol monoethyl ether, and tripropylene glycol monobutyl ether); and combinations of two or more of these solvents may also be used. Of these solvents, combining diethylene glycol monobutyl ether, triethylene glycol monobutyl ether or dipropylene glycol monomethyl ether or the like with the polyethylene glycol monoalkyl ether of the water-soluble organic solvent B is preferred.

In those cases where these other solvents are also used, the proportion of the polyethylene glycol monoalkyl ether represented by the formula (1) within the water-soluble organic solvent B is preferably at least 50% by mass. Moreover, the proportion of tetraethylene glycol monobutyl ether within the water-soluble organic solvent B is preferably at least 50% by mass.

From the viewpoints of factors such as the ink storage stability, the head performance upon standing, and the ink discharge characteristics, the quantity of the water-soluble organic solvent A within the ink is preferably within a range from 2 to 25% by mass, and is even more preferably from 3 to 20% by mass. If this quantity is either too large or too small, then avoiding an increase in the ink viscosity, or optimizing the ink viscosity, becomes difficult.

Generally, inks that contain a large quantity (equivalent to about 15% by mass or more within the ink) of a low-polarity solvent (such as the water-soluble organic solvent B) tend to suffer from a dramatic deterioration in the storage stability, but by including even small quantity of this high-polarity solvent (the water-soluble organic solvent A), the pigment dispersibility can be stabilized, and the storage stability of the ink can be enhanced.

From the viewpoints of factors such as the suppression of curling and the prevention of increases in ink viscosity, the quantity of the water-soluble organic solvent B within the ink is preferably within a range from 15 to 45% by mass, and is even more preferably from 20 to 40% by mass.

The water content within the ink is preferably within a range from 30 to 80% by mass, even more preferably from 40 to 70% by mass, and is most preferably from 45 to 60% by mass. The water used is preferably a pure water or ultra pure water such as an ion-exchanged water or distilled water.

Examples of pigments that can be used include organic pigments such as azo-based pigments, phthalocyanine-based pigments, dye-based pigments, condensed polycyclic pigments, nitro-based pigments, and nitroso-based pigments (such as brilliant carmine 6B, lake red C, Watchung red, disazo yellow, Hansa yellow, phthalocyanine blue, phthalocyanine green, alkali blue, and aniline black); inorganic pigments, including metals such as cobalt, iron, chrome, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black, and channel black. These pigments may be used either alone, or in combinations of two or more different pigments.

Moreover, the use of a self-dispersing pigment, in which hydrophilic functional groups have been introduced at the surface of the pigment via a chemical or physical treatment, is preferred. The hydrophilic functional groups introduced into self-dispersing pigments preferably exhibit ionic properties, and by charging the surface of the pigment by imparting the surface with anionic or cationic properties, electrostatic repulsive forces enable the pigment particles to remain stably dispersed within water. Examples of preferred anionic functional groups include a sulfonic acid group, carboxyl group, carbonyl group, hydroxyl group, and phosphonic acid group. Examples of preferred cationic functional groups include a quaternary ammonium group and a quaternary phosphonium group.

These hydrophilic functional groups may be bonded directly to the pigment surface, or may be bonded to the surface via other groups of atoms. Examples of these other groups of atoms include alkylene groups, phenylene groups and naphthylene groups, although this is not an exhaustive list. Examples of methods of treating the pigment surface include a diazotization treatment, sulfonation treatment, hypochlorination treatment, humic acid treatment and vacuum plasma treatment.

The blend quantity of the pigment (solid fraction) within the ink is preferably within a range from 0.1 to 25% by mass, even more preferably from 1 to 20% by mass, and is most preferably from 5 to 15% by mass.

The ideal range for the ink viscosity varies depending on factors such as the diameter of the discharge head nozzles and the discharge environment, but at 23° C. is typically within a range from 1 to 30 mPa·s, and even more preferably from 5 to 15 mPa·s. A viscosity of approximately 10 mPa·s is ideal for use with inkjet recording devices. Here, the viscosity is measured at 23° C. by raising the shear stress from 0 Pa at a rate of 0.1 Pa/s, and refers to the measured value at 10 Pa.

If required, any of the various additives typically used within the field may be added to the ink, provided the inclusion of these additives does not impair the object of the present invention.

Specific examples of these additives include anionic surfactants, cationic surfactants, amphoteric surfactants, nonionic surfactants, or polymer-based, silicone-based or fluorine-based surfactants, which are added to the ink as pigment dispersants, antifoaming agents, or surface tension reducing agents or the like.

An electrolyte may also be added to the ink to regulate the viscosity of the ink. Examples of these electrolytes include sodium sulfate, potassium hydrogen phosphate, sodium citrate, potassium tartrate and sodium borate, and two or more of these electrolytes may also be used in combination.

Conventional pH regulators may also be added to regulate the pH of the ink. Compounds such as sulfuric acid, nitric acid, acetic acid, sodium hydroxide, potassium hydroxide, ammonium hydroxide and triethanolamine may be used as either pH regulators or ink thickening assistants.

By adding an antioxidant to the ink, oxidation of the ink components can be prevented, enabling the storage stability of the ink to be improved. Examples of typical antioxidants include L-ascorbic acid, sodium L-ascorbate, sodium isoascorbate, potassium sulfite, sodium sulfite, sodium thiosulfate, sodium dithionite and sodium pyrosulfite.

By adding a preservative, decomposition of the ink can be prevented, enabling the storage stability of the ink to be improved. Examples of typical preservatives include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro- 1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

Of the optional components described above, the ink preferably includes a specific variety of surfactant, as adding such a surfactant further enhances the continuous discharge performance.

Specifically, this variety of surfactant is preferably a fatty acid ester of a fatty acid containing 6 to 12 carbon atoms such as caproic acid, caprylic acid, capric acid or lauric acid, and is preferably one or more fatty acid esters selected from the group consisting of polyglycerol fatty acid esters, polyethylene glycol fatty acid esters and polyoxyethylene sorbitan fatty acid esters. If the number of carbon atoms within the fatty acid is fewer than 6, then the anticipated surfactant effect obtained by adding the surfactant may not be fully realized. In contrast, if the number of carbon atoms within the fatty acid exceeds 12, then the continuous discharge performance of the ink may actually deteriorate, and the surfactant may also become difficult to dissolve in the ink, causing a deterioration in the ink stability.

These fatty acid esters may be either monoesters, or polyesters in which two or more fatty acids are esterified. The polymerization degree of the glycerol in a polyglycerol fatty acid ester is preferably within a range from approximately 6 to 10. The polymerization degree (EO) of the ethylene glycol (or ethylene oxide) within a polyethylene glycol fatty acid ester is preferably within a range from approximately 6 to 25.

The polymerization degree (EO) of the ethylene glycol (or ethylene oxide) within a polyoxyethylene sorbitan fatty acid ester is preferably within a range from approximately 6 to 25.

Specific examples of these surfactants include hexaglyceryl monolaurate, decaglyceryl monolaurate, polyethylene glycol monolaurate, polyoxyethylene sorbitan monolaurate, hexaglyceryl monocaprylate, decaglyceryl monocaprylate, polyethylene glycol monocaprylate, and polyoxyethylene sorbitan monocaprylate.

When added, the quantity of the above fatty acid ester within the ink is preferably within a range from 0.1 to 2% by mass, and is even more preferably from 0.3 to 1.5% by mass. If the fatty acid ester is added in a quantity exceeding 2% by mass, then not only is no further increase in effect observed, but there is actually a danger that the continuous discharge performance of the ink may deteriorate.

A printed item according to the present invention is an item printed by an inkjet recording method using the ink of the present invention described above. The inkjet printer may employ any of various printing systems, including a piezo system, electrostatic system or thermal system. The printer discharges the ink according to the present invention from the inkjet head based on a digital signal, and adheres the discharged ink droplets to a recording medium.

According to the present invention, because paper deformation such as curling is effectively prevented, the paper transport properties are favorable, meaning high-speed printing of, for example 120 pages per minute can be conducted. Moreover, by improving the storage stability of the ink (the head performance upon standing) and the continuous discharge characteristics, the ink of the present invention is able to be used favorably within line head inkjet printer systems.

EXAMPLES

A more detailed description of the present invention is provided below based on a series of examples, although the present invention is in no way limited by these examples. In the following description, the units "% by mass" are recorded simply as "%", and the units "parts by mass" are recorded simply as "parts".

Examples and Comparative Examples

Inks were prepared with the formulations shown in Table 1 to Table 3. The components used are listed below.

Pigment "CAB-O-JET 300" (a carbon black, Cabot Corporation) Diglycerol (Sakamoto Yakuhin Kogyo Co., Ltd.)

Polyglycerol "#750" (hydroxyl group number: 870 to 910, Sakamoto Yakuhin Kogyo Co., Ltd.)

Glycerol (Wako Pure Chemical Industries, Ltd.)

Polyethylene glycol "#200" (Wako Pure Chemical Industries, Ltd.)

Tetraethylene glycol monobutyl ether (Kyowa Hakko Chemical Co., Ltd.)

Triethylene glycol monobutyl ether (Wako Pure Chemical Industries, Ltd.)

Diethylene glycol monobutyl ether (Wako Pure Chemical Industries, Ltd.)

Tripropylene glycol monobutyl ether (Dow Chemical Company)

Surfactant "Surfinol 465" (acetylene glycol ethylene oxide, Air Products and Chemicals Inc.)

TEA (pH regulator, triethanolamine, Wako Pure Chemical Industries, Ltd.)

Hexaglyceryl monolaurate "NIKKOL Hexaglyn 1-L" (Nikko Chemicals Co., Ltd.)

Decaglyceryl monolaurate "NIKKOL Decaglyn 1-L" (Nikko Chemicals Co., Ltd.)

Decaglyceryl monocaprylate "SY-Glyster MCA-750" (Sakamoto Yakuhin Kogyo Co., Ltd.)

Polyethylene glycol monolaurate "NIKKOL MYL-10" (EO=10, Nikko Chemicals Co., Ltd.)

Polyoxyethylene sorbitan monolaurate "RHEODOL TW-L106" (EO=6, Kao Corporation)

Hexaglyceryl monomyristate "NIKKOL Hexaglyn 1-M" (Nikko Chemicals Co., Ltd.)

Decaglyceryl monomyristate "NIKKOL Decaglyn 1-M" (Nikko Chemicals Co., Ltd.)

Decaglyceryl monooleate "NIKKOL Decaglyn 1-O" (Nikko Chemicals Co., Ltd.)

Polyethylene glycol monooleate "NIKKOL MYO-10" (EO=10, Nikko Chemicals Co., Ltd.)

Polyoxyethylene sorbitan monooleate "RHEODOL TW-O120" (EO=20, Kao Corporation)

Polyoxyethylene lauryl ether sulfate ester salt "EMAL 20C" (Kao Corporation)

Lauryl betaine ($C_{12}H_{25}$—$N^+(CH_3)_2CH_2COO^-$) "AMPHITOL 20BS" (Kao Corporation)

<Evaluation of Properties>
(1) Paper Deformation immediately following Printing

Using a line-type inkjet printer "ORPHIS HC5500" (manufactured by Riso Kagaku Corporation), the paper was evaluated for the presence of deformation immediately following printing. The ink path within the ORPHIS HC5500 was partially modified to enable the printing of aqueous inks. The paper used was Riso lightweight paper (A4 size, manufactured by Riso Kagaku Corporation), the discharge volume per dot was set to 30 pL, and a solid image was formed across the entire surface of one side of the paper. The evaluation criteria are shown below.

A: paper feeding was possible immediately following printing, and paper ejection was also favorable.

B: paper feeding was possible immediately following printing, but the ejected sheets of paper did not align.

C: a paper jam occurred immediately following printing, and paper feeding was impossible.

(2) Paper Deformation following Standing

Following formation of solid images in the same manner as that described above in (1), the printed pages were left to stand for one week in an atmosphere at 23° C. and 50% RH, and were then evaluated using the criteria shown below.

A: The degree of deformation in the thickness direction of the printed items was not more than 5 mm, and when stacked together, the printed items did not occupy a large (bulky) volume.

B: The degree of deformation in the thickness direction of the printed items was not more than 5 mm, but when stacked together, the printed items occupied a large (bulky) volume.

C: The degree of deformation in the thickness direction of the printed items was at least 5 mm, and when stacked together, the printed items occupied a large (bulky) volume.

(3) Head Performance upon Standing

The ink was introduced into the ink path of an ORPHIS HC5500 in which the ink path had been partially modified in the manner described above, and the printer was left to stand for one week in an atmosphere at 45° C. and 30% RH. The printer was then reactivated, and a discharge test was conducted and evaluated against the criteria shown below.

A: the drive voltage was appropriate, no missing nozzles were observed, and discharge was possible from the first dot.

B: the drive voltage was appropriate, but some missing nozzles were observed.

C: a drive voltage capable of producing normal discharge was unobtainable, and many missing nozzles were observed.

(4) Continuous Discharge Performance

The inkjet head of an ORPHIS HC5500 was mounted in a continuous discharge jig (a device in which any inkjet head may be mounted, and in which the drive conditions and the like can be set as desired). The discharge volume per dot was set to 42 pL, and ink discharge was conducted continuously for 10 minutes through all 318 nozzles. After 10 minutes, the number of non-discharging nozzles amongst the 318 nozzles was counted and evaluated against the criteria shown below. The test was conducted 3 times.

A: in all three tests, the number of non-discharging nozzles was either 0 or 1.

B: in all three tests, the number of non-discharging nozzles was not more than 5.

C: in all three tests, the number of non-discharging nozzles was not more than 20.

D: in at least one test, the number of non-discharging nozzles exceeded 20.

(5) Storage Stability

Each ink was placed in a sealed container and left to stand for one week at 70° C., the variation in the ink viscosity was measured, and the measurement results were then evaluated against the criteria shown below.

Viscosity variation=[(Viscosity after 1 week×100)/(Initial viscosity value)]−100 (%)

Inks for which the viscosity variation was less than 5% were evaluated as A, and inks for which the viscosity variation was at least 5% were evaluated as C.

The above results are summarized in the tables below.

TABLE 1

|  |  | Example |  |  |  |  |  |  |  | Comparative example |  |  |  |
|---|---|---|---|---|---|---|---|---|---|---|---|---|---|
|  |  | 1 | 2 | 3 | 4 | 5 | 6 | 7 | 8 | 1 | 2 | 3 | 4 |
| Ink blend quantity (% by mass) | Pigment (solid fraction) | 8.0 | 8.0 | 5.0 | 8.0 | 8.0 | 8.0 | 8.0 | 8.0 | 8.0 | 8.0 | 8.0 | 8.0 |
|  | Ion-exchanged water | 50.0 | 50.0 | 50.0 | 50.0 | 50.0 | 50.0 | 50.0 | 50.0 | 50.0 | 50.0 | 50.0 | 50.0 |
|  | Diglycerol | 10.0 | 20.0 | 3.0 |  | 10.0 | 10.0 | 10.0 | 10.0 |  |  | 10.0 | 10.0 |
|  | Polyglycerol #750 |  |  |  | 20.0 |  |  |  |  |  |  |  |  |
|  | Glycerol |  |  |  |  |  |  |  |  | 10.0 |  |  |  |
|  | Polyethylene glycol #200 |  |  |  |  |  |  |  |  |  | 10.0 |  |  |
|  | Tetraethylene glycol monobutyl ether | 30.0 | 20.0 | 40.0 | 20.0 | 15.0 | 15.0 | 15.0 | 12.0 | 30.0 | 30.0 |  |  |
|  | Triethylene glycol monobutyl ether |  |  |  |  | 15.0 |  |  |  |  |  |  | 30.0 |
|  | Diethylene glycol monobutyl ether |  |  |  |  |  | 15.0 |  | 18.0 |  |  |  |  |
|  | Tripropylene glycol monobutyl ether |  |  |  |  |  |  | 15.0 |  |  |  | 30.0 |  |
|  | Surfinol 465 | 1.0 | 1.0 | 1.0 | 1.0 | 1.0 | 1.0 | 1.0 | 1.0 | 1.0 | 1.0 | 1.0 | 1.0 |
|  | TEA | 1.0 | 1.0 | 1.0 | 1.0 | 1.0 | 1.0 | 1.0 | 1.0 | 1.0 | 1.0 | 1.0 | 1.0 |
|  | Total | 100.0 | 100.0 | 100.0 | 100.0 | 100.0 | 100.0 | 100.0 | 100.0 | 100.0 | 100.0 | 100.0 | 100.0 |
| Evaluation results | Paper deformation immediately following printing | A | A | A | A | A | A | A | B | C | C | A | A |
|  | Paper deformation following standing | A | A | A | A | A | A | A | B | C | C | C | A |
|  | Head performance upon standing | A | A | A | A | A | A | A | A | A | A | C | A |
|  | Continuous discharge performance | B | B | B | B | B | B | B | B | B | B | D | D |
|  | Storage stability | A | A | A | A | A | A | A | A | A | A | C | A |

TABLE 2

|  |  | Example |  |  |  |  |  |  |  |  |
|---|---|---|---|---|---|---|---|---|---|---|
|  |  | 9 | 10 | 11 | 12 | 13 | 14 | 15 | 16 | 17 |
| Ink blend quantity (% by mass) | Pigment (solid fraction) | 5.0 | 5.0 | 5.0 | 5.0 | 5.0 | 5.0 | 5.0 | 5.0 | 5.0 |
|  | Polyglycerol #750 | 20.0 | 20.0 |  | 20.0 | 20.0 | 20.0 | 20.0 | 20.0 | 20.0 |
|  | Diglycerol |  |  | 10.0 |  |  |  |  |  |  |
|  | Tetraethylene glycol monobutyl ether | 24.0 | 23.0 | 33.0 | 23.5 | 23.7 | 23.0 | 23.0 | 23.0 | 23.0 |
|  | Hexaglyceryl monolaurate |  | 1.0 | 1.0 | 0.5 | 0.3 |  |  |  |  |
|  | Decaglyceryl monolaurate |  |  |  |  |  | 1.0 |  |  |  |
|  | Decaglyceryl monocaprylate |  |  |  |  |  |  | 1.0 |  |  |
|  | Polyethylene glycol monolaurate |  |  |  |  |  |  |  | 1.0 |  |
|  | Polyoxyethylene sorbitan monolaurate |  |  |  |  |  |  |  |  | 1.0 |
|  | Surfinol 465 | 1.0 | 1.0 | 1.0 | 1.0 | 1.0 | 1.0 | 1.0 | 1.0 | 1.0 |
|  | Ion-exchanged water | 50.0 | 50.0 | 50.0 | 50.0 | 50.0 | 50.0 | 50.0 | 50.0 | 50.0 |
|  | Total | 100.0 | 100.0 | 100.0 | 100.0 | 100.0 | 100.0 | 100.0 | 100.0 | 100.0 |
| Evaluation results | Paper deformation immediately following printing | A | A | A | A | A | A | A | A | A |
|  | Paper deformation following standing | A | A | A | A | A | A | A | A | A |
|  | Head performance upon standing | A | A | A | A | A | A | A | A | A |
|  | Continuous discharge performance | B | A | A | A | A | A | A | A | A |
|  | Storage stability | A | A | A | A | A | A | A | A | A |

TABLE 3

|  |  | Reference example ||||||||
|  |  | 1 | 2 | 3 | 4 | 5 | 6 | 7 | 8 |
|---|---|---|---|---|---|---|---|---|---|
| Ink blend quantity (% by mass) | Pigment (solid fraction) | 5.0 | 5.0 | 5.0 | 5.0 | 5.0 | 5.0 | 5.0 | 5.0 |
|  | Polyglycerol #750 | 20.0 | 20.0 | 20.0 | 20.0 | 20.0 | 20.0 | 20.0 | 20.0 |
|  | Diglycerol |  |  |  |  |  |  |  |  |
|  | Tetraethylene glycol monobutyl ether | 23.0 | 23.5 | 23.0 | 23.0 | 23.0 | 23.0 | 23.0 | 23.0 |
|  | Hexaglyceryl monomyristate | 1.0 | 0.5 |  |  |  |  |  |  |
|  | Decaglyceryl monomyristate |  |  | 1.0 |  |  |  |  |  |
|  | Decaglyceryl monooleate |  |  |  | 1.0 |  |  |  |  |
|  | Polyethylene glycol monooleate |  |  |  |  | 1.0 |  |  |  |
|  | Polyoxyethylene sorbitan monooleate |  |  |  |  |  | 1.0 |  |  |
|  | Polyoxyethylene lauryl ether sulfate ester salt |  |  |  |  |  |  | 1.0 |  |
|  | Lauryl betaine |  |  |  |  |  |  |  | 1.0 |
|  | Surfinol 465 | 1.0 | 1.0 | 1.0 | 1.0 | 1.0 | 1.0 | 1.0 | 1.0 |
|  | Ion-exchanged water | 50.0 | 50.0 | 50.0 | 50.0 | 50.0 | 50.0 | 50.0 | 50.0 |
|  | Total | 100.0 | 100.0 | 100.0 | 100.0 | 100.0 | 100.0 | 100.0 | 100.0 |
| Evaluation results | Paper deformation immediately following printing | A | A | A | A | A | A | A | A |
|  | Paper deformation following standing | A | A | A | A | A | A | A | A |
|  | Head performance upon standing | A | A | A | A | A | A | A | A |
|  | Continuous discharge performance | D | C | D | D | D | D | B | B |
|  | Storage stability | A | A | A | A | A | A | A | A |

As is evident in the inks of the above examples, the present invention is able to provide an ink that exhibits favorable storage stability and discharge characteristics, and by using this ink, high-speed printing with suppressed paper deformation can be achieved. Moreover, the inks of the above examples prevent deviation in the position of dot impact, and enable better uniformity in the alignment of the ink droplets, meaning they can also be used favorably within line head inkjet printer systems.

With the inks of the examples 1 to 8, a few non-discharging nozzles developed during the continuous discharge tests, but they did not present a problem from a practical perspective. In the inks of the examples 9 to 17, which also included a specified surfactant, even more superior continuous discharge performance was obtained. Of these, in the examples 10 to 15, the number of non-discharging nozzles was 0 within all three tests.

Moreover, as can be seen from the reference examples 1 to 8, when the type of surfactant was altered, not only did the addition of the surfactant yield no improvement in the continuous discharge performance, but in some cases the performance actually deteriorated.

In the comparative examples 3 and 4, a plurality of non-discharging nozzles developed in the continuous discharge tests, and the resulting printed items included thick white banding which would prevent practical application.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An aqueous ink for an inkjet, comprising:
a pigment;
a water-soluble organic solvent A comprising at least one of a diglycerol and a polyglycerol;
a water-soluble organic solvent B comprising a polyethylene glycol monoalkyl ether represented by formula (1): RO—$(CH_2CH_2O)_n$—H wherein R represents an alkyl group having from 4 to 6 carbon atoms, and n represents an integer from 4 to 6; and
water.

2. The aqueous ink for an inkjet according to claim 1, wherein the polyethylene glycol monoalkyl ether is tetraethylene glycol monobutyl ether.

3. The aqueous ink for an inkjet according to claim 1, wherein the water-soluble organic solvent A is present in an amount of from 2 to 25% by mass based on the total mass of the aqueous ink.

4. The aqueous ink for an inkjet according to claim 1, wherein the water-soluble organic solvent B is present in an amount of from 15 to 45% by mass based on the total mass of the aqueous ink.

5. The aqueous ink for an inkjet according to claim 2, wherein a proportion of the tetraethylene glycol monobutyl ether within the water-soluble organic solvent B is at least 50% by mass.

6. The aqueous ink for an inkjet according to claim 1, wherein the pigment is a self-dispersing pigment.

7. The aqueous ink for an inkjet according to claim 1, further comprising a fatty acid ester of a fatty acid having from 6 to 12 carbon atoms, the fatty acid ester comprising one or more fatty acid esters selected from the group consisting of polyglycerol fatty acid esters, polyethylene glycol fatty acid esters, and polyoxyethylene sorbitan fatty acid esters.

8. The aqueous ink for an inkjet according to claim 7, wherein the fatty acid ester is present in an amount of from 0.1 to 2% by mass based on the total mass of the aqueous ink.

9. A printed item, printed utilizing the aqueous ink for an inkjet according to claim 1.

* * * * *